T. H. BROWN.
Sulky.
No. 209,109.  Patented Oct. 22, 1878.
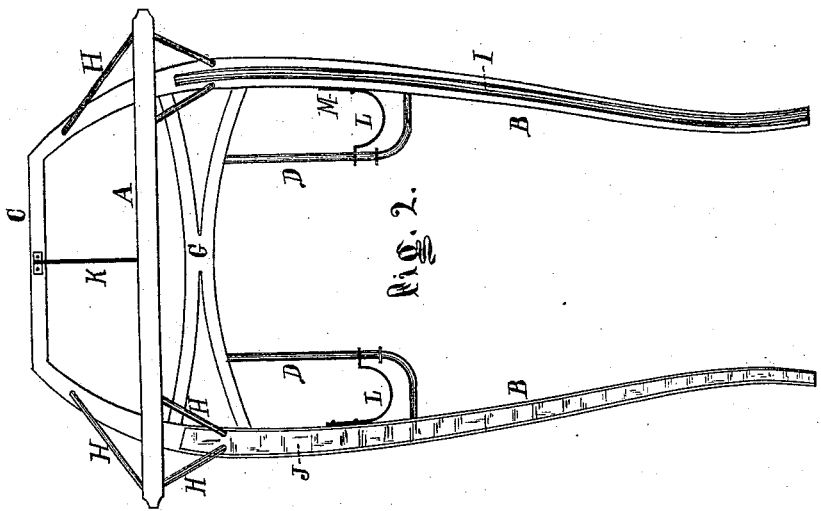
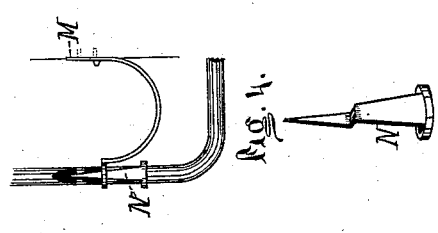
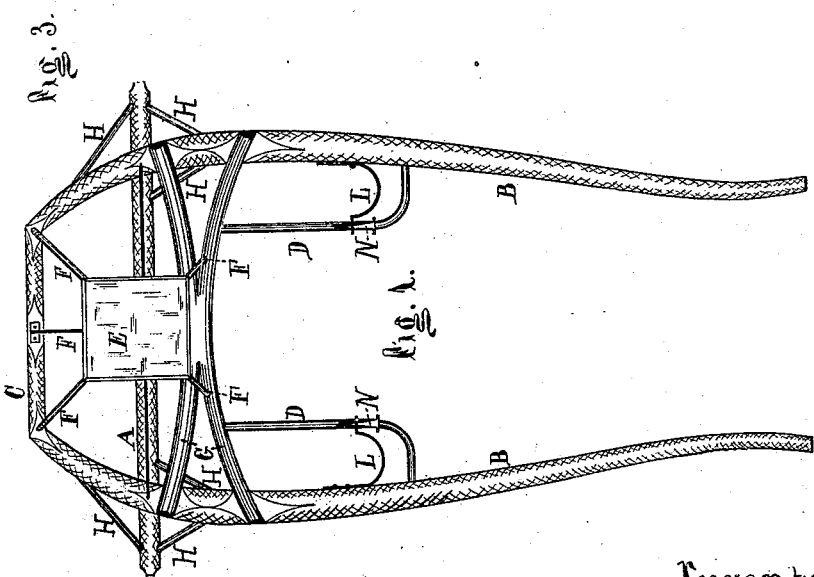
Witnesses.
A. G. Morey.
F. W. Fowler
Inventor.
Thomas H. Brown by
G. L. Chapin
Atty.

UNITED STATES PATENT OFFICE.

THOMAS H. BROWN, OF CHICAGO, ILLINOIS.

IMPROVEMENT IN SULKIES.

Specification forming part of Letters Patent No. 209,109, dated October 22, 1878; application filed June 21, 1878.

*To all whom it may concern:*

Be it known that I, THOMAS H. BROWN, of Chicago, in the county of Cook and State of Illinois, have invented certain new and useful Improvements in Sulkies, of which the following is a specification:

The nature of the present invention consists in a connecting-rod rigidly attached to the axle-tree and to the rear shaft-bar, for the purpose of preventing the axle-tree from being curved backward by the inward spring of the shafts when geared to a horse. In thus keeping the axle-tree straight the wheels remain parallel, and are not curved in at their forward parts to cause extra friction by scraping the track.

I am aware that braces have been used as an attachment to sulkies where elliptical springs were employed, but were used at the shoulders of the axle-tree, and not to prevent the axle-tree from springing.

In the drawings, Figure 1 is a top or plan view of a sulky embodying my improvement, the wheels being removed; Fig. 2, an inverted view of Fig. 1, and Figs. 3 and 4 are detail views of the stirrup.

A represents the axle-tree; B B, the shafts; C, the rear shaft-bar; D, shaft-braces; E, the seat; F, the seat-supports; G, compound brace-bar, and H H H H shaft-supports of a well-constructed sulky used for speeding horses. K represents a metal brace rigidly attached to the axle-tree A and to the rear shaft-bar C, for the purpose herein expressed.

I claim as new and desire to secure by Letters Patent—

The brace K, attached to the middle part of the axle-tree A and the rear shaft-bar C, and combined with them, for the purpose specified.

THOMAS H. BROWN.

Witnesses:
G. L. CHAPIN,
A. G. MOREY.